May 31, 1932. F. MAGEE ET AL 1,861,312
ANIMAL TRAP
Filed July 19, 1930 2 Sheets-Sheet 2
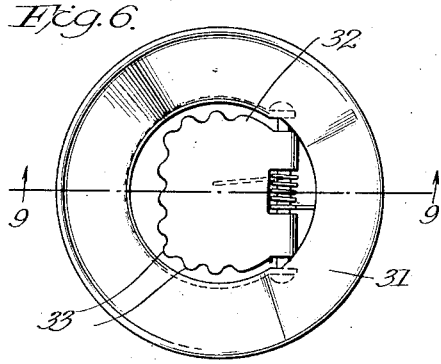
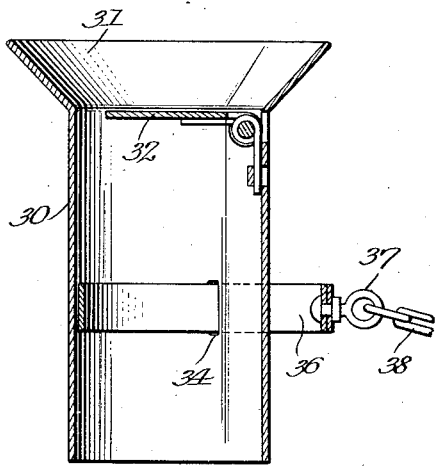
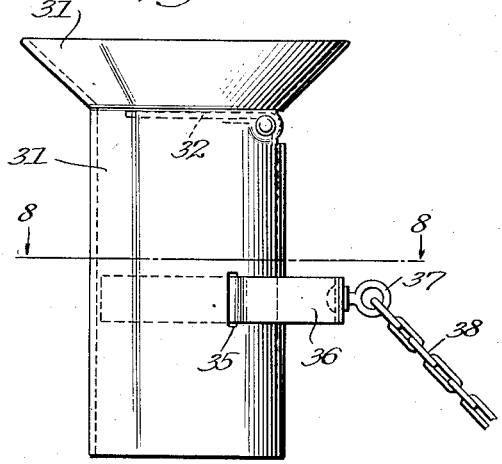
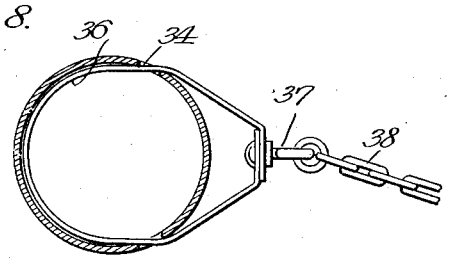
Inventors
Frank Magee
George W. Haverbeck Patented May 31, 1932

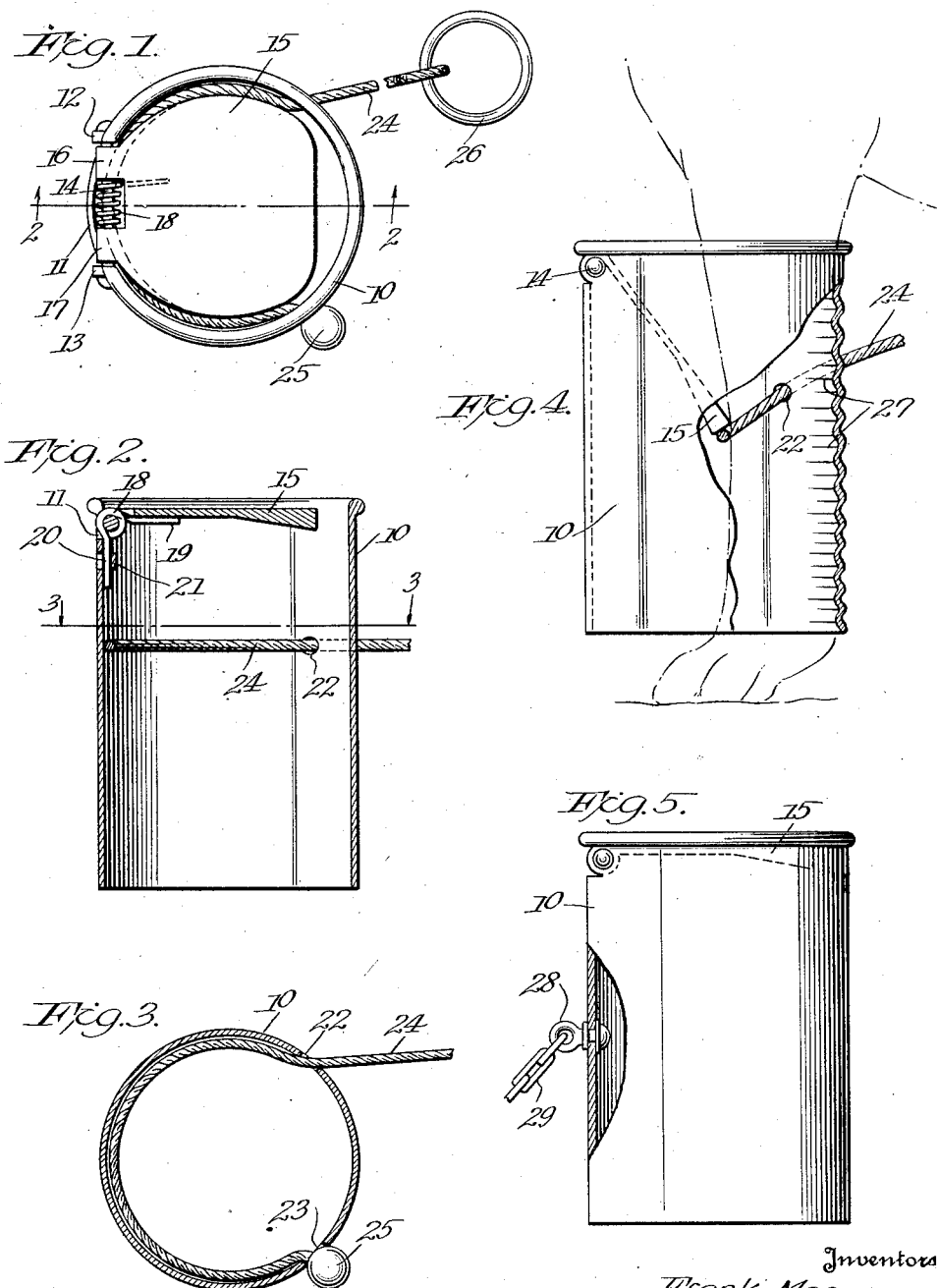

1,861,312

UNITED STATES PATENT OFFICE

FRANK MAGEE AND GEORGE WASHINGTON HAVERBECK, OF TARRYTOWN, NEW YORK

ANIMAL TRAP

Application filed July 19, 1930. Serial No. 469,228.

The present invention relates to an animal trap designed with a view to holding without injury, an animal caught therein. Broadly speaking, the trap comprises an abutment and a jaw, the jaw being moved relative to the abutment to securely engage the leg of an animal caught therebetween when the animal attempts to withdraw the leg. Further, in the preferred form of the invention, a noose-like element is provided for co-operation with the jaw in securely and painlessly retaining an animal caught in the trap.

In the accompanying drawings we have illustrated preferred embodiments of the invention, although it will be understood that we by no means restrict ourselves to the details shown and to be described hereinafter.

In the drawings:

Figure 1 is a plan view of a trap according to our invention.

Figure 2 is a section on line 2—2 of Figure 1.

Figure 3 is a section on line 3—3 of Figure 2.

Figure 4 is a side elevation of the trap of Figure 1, partly broken away to show the manner of operation.

Figure 5 illustrates a slightly modified form which the invention may take.

Figure 6 is a plan view of a further embodiment of the invention.

Figure 7 is an elevation of the trap of Figure 6.

Figure 8 is a section on line 8—8 of Figure 7, and

Figure 9 is a section on line 9—9 of Figure 6.

Referring first of all to Figures 1 to 4, reference numeral 10 designates a housing in the form of a tubular member here shown as being cylindrical. In use, the trap will ordinarily be set as indicated in Figures 2 and 4, that is, with the axis of the housing extending substantially vertically and the description will be made with the assumption that the trap is in this position.

At the upper end of the housing, a short wall portion is cut out to form a recess 11, the side walls of the recess being bent into substantially parallel relation to form wings 12 and 13 which support a pintle 14. A jaw member 15 in the form of a flap, substantially closes the top of the housing and is formed with a pair of knuckles 16 and 17 mounted on pintle 14. Between the knuckles is mounted a coil spring 18, one of whose ends 19 overlies the flap, the other end 20 being engaged behind a clip 21 struck from the housing wall. Ends 19 and 20 are normally in rectangular relation and hence yieldingly support the flap in substantially perpendicular relation to the axis of housing 10; this being, of course, the maximum closing position of the flap. Spring 18 is preferably relatively weak and need be only sufficiently strong to hold the flap in substantially the described position relative to the housing.

On the side opposite pintle 14, the housing is provided with a pair of apertures 22 and 23 which lie in a plane substantially perpendicular to the housing axis. A flexible element, such as a twisted wire, 24 is lead through aperture 22, looped about a major arc of the housing and passed out through aperture 23 and the end provided with an abutment in the form of a ball 25. The opposite end of the flexible element is desirably provided with a ring 26 which may be secured to a fixed body externally of the housing, the flexible element serving as anchoring means for the trap.

Displacement of the trap causes contraction of the loop portion of element 24, such portion acting, in conjunction with the minor wall space between the perforations, as a noose. The disposition of the flexible element within the housing is preferably related to flap 15 in such a manner that when the flap is swung downwardly it will lie within the loop and upon contraction of the latter will be assisting in swinging back to normal or horizontal position. Flexible element 24 is preferably somewhat springy so that as the loop contracts and passes a certain dead center point, it will spring to a substantially straight line position between perforations 22 and 23 provided it is unrestrained.

In practice, the trap thus described, is positioned as in Figure 2, with its top substantially at the level of the ground or other concealment and a stake is driven through ring 26. When an animal treads upon flap 15 the latter immediately drops to the position indicated in Figure 4 permitting the leg of the animal to take the position indicated in this figure, within the looped portion of element 24. Spring 18 causes the flap to bear against the animal's leg in the manner indicated, and displacement of the trap due to movement of the animal will cause contraction of the loop so that it slides along the end of the flap to the position shown in Figure 4, wherein it grips the leg. Preferably, the abutment portion of the housing, that is, the portion adjacent the free end of flap 15, is corrugated as at 27, Figure 4, so as to engage the leg more securely.

Due to the weakness of spring 18, substantially no pressure is exerted on the leg by flap 15, unless withdrawal is attempted, and then a secure wedging action occurs.

In actual use animals have been caught in traps such as above described and held for a number of hours before release without any injury whatever. The trap is positively acting, but at the same time, substantially painless.

The modification shown in Figure 5 differs from the trap above described in that the noose element is omitted and the housing is merely provided with an eye-bolt 28 to which an anchor chain 29 is secured.

According to Figure 6, a cylindrical housing member 30 is provided with an upwardly flared portion 31 at its upper end. A flap 32 is supported in the upper end of the tubular member in exactly the same manner as described in connection with Figures 1 to 4, flap 32, however, having its free edges provided with blunt serrations 33.

Below flap 32 and out of the swinging range thereof, the housing is provided with a pair of slots 34 and 35 through which are passed outwardly the free ends of a loop element 36, in the form of a strap, the ends being connected by means of an eye-bolt to which an anchoring chain 38 is secured. According to this embodiment, the noose arrangement is adapted to close in a direction toward the pintle, thus forcing the leg of an animal caught in the trap against the free edge of the flap. As opposed to this action, it will be recalled that according to the embodiment first described, the contraction of the noose arrangement is in a direction away from the pintle. It is in this particular that the principal difference between the two embodiments lies. For the rest, housing 10 may be provided with an upwardly flared guide portion such as 31 and either type of loop element may be used in either embodiment. While the noose arrangements add to the efficacy of the trap, it will be understood that this feature is of a more or less precautionary and subsidiary nature, the trap shown in Figure 5 being sufficiently positive in its action for most uses.

Traps according to the present invention may be made in any desired size. While we have shown and described embodiments of the invention comprising tubular housings of cylindrical form, it will be understood that the housing may be of any equivalent form, as conical, polyhedronal, etc. Further, the walls of the housing need not be imperforate, as shown, but if desired may be perforate or formed of mesh material. While, as stated, the trap will ordinarily be positioned in upright position, under some circumstances it will preferably be disposed in a horizontal position. We do not necessarily limit ourselves in these particulars.

We claim:

1. An animal trap comprising a housing with an opening therein, a member at least partially closing said opening in normal position but movable inwardly of the housing out of closing relation thereto, and yieldable means tending to maintain said member in normal position.

2. An animal trap comprising a housing with an opening therein, a pivoted flap at least partially closing said opening in normal position but swingable inwardly of the housing out of closing relation thereto, and yieldable means tending to maintain said flap in normal position.

3. An animal trap comprising a member provided with a normally vertically directed opening, a pivoted normally horizontal flap at least partially closing said opening but swingable downwardly to give access through the opening, and yieldable means tending to maintain said flap in horizontal position.

4. An animal trap comprising a tubular member having an open end, a flap pivoted to said member and at least partially closing said open end in normal position but swingable inwardly of said member out of closing relation thereto, and yieldable means tending to maintain said flap in normal position.

5. An animal trap comprising a tubular member having an open end, a flap pivoted to said member and at least partially closing said open end in normal position but swingable inwardly of said member out of closing relation thereto, yieldable means tending to maintain said flap in normal position, and means for anchoring said member, the inner surface of said member adjacent the free end of said flap being provided with a transverse rib.

6. An animal trap comprising a tubular member having an open end, a flap pivoted to said member and at least partially closing said open end in normal position but swingable inwardly of said member out of closing relation thereto, yieldable means tending to maintain said flap in normal position, and means for anchoring said member, the free end of said flap being serrated.

7. An animal trap comprising a hollow tubular member having an open end, said tubular member being provided with a perforated wall, a flexible element passed through said perforated wall and looped against the inner surface of said tubular member, said flexible element being securable to a fixed body external of said member whereby displacement of the latter resulting in tensioning of said flexible element causes contraction of the looped portion of said element.

8. An animal trap comprising a hollow tubular member having an open end, said tubular member being provided with a pair of perforations in a wall thereof, a flexible element having its ends passed outwardly through said perforations and its inner portion looped against the wall opposite said apertures, the ends of said flexible element being securable to a fixed body external of said member whereby displacement of the latter resulting in tensioning of said flexible element causes contraction of the looped portion of said element.

9. An animal trap comprising a hollow tubular member having an open end, said tubular member being provided with a perforation in a wall thereof, a flexible element having an end passed inwardly of the member through said perforation, carried around the inner surface of said member in a loop and anchored adjacent said perforation, the other end of said flexible element being securable to a fixed body external of said member whereby displacement of the latter resulting in tensioning of said flexible element causes contraction of the looped portion of said element.

10. An animal trap comprising a hollow tubular member having an open end, said tubular member being provided with a pair of spaced perforations in a wall thereof, a flexible element having an end passed through said perforations, the portion of said element between the perforations, when slack, being disposable in loop arrangement against the wall opposite the perforations but upon being tensioned moving toward the wall portion between said perforations, and a stop on one end of said element, the other end of said element being securable to a fixed body external to said member.

11. An animal trap comprising a hollow tubular member having an open end, said tubular member being provided with a pair of spaced perforations in a wall thereof, a flexible element having an end passed through said perforations, the portion of said element between the perforations, when slack, being disposable in loop arrangement against the wall opposite the perforations but being springable upon tensioning toward the wall portion between the perforations, and a stop on one end of said element, the other end of said element being securable to a fixed body external to said member.

12. An animal trap comprising a hollow tubular member having an open end, a flap pivoted to said member and at least partially closing said open end in normal position but swingable inwardly of said member out of closing relation thereto, yieldable means tending to maintain said flap in normal position, and a flexible element passed freely through an apertured wall of said tubular member, and having a contractible noose-like portion within the member, the outer end of said element being anchorable externally of said member.

13. An animal trap comprising a hollow tubular member having an open end, a flap pivoted to said member and at least partially closing said open end in normal position but swingable inwardly of said member out of closing relation thereto, yieldable means tending to maintain said flap in normal position, and a flexible element passed freely through an apertured wall of said tubular member, and having a contractible noose-like portion within the member, the outer end of said element being anchorable externally of said member, said noose-like portion in contracting moving toward the pivoted portion of the flap.

14. An animal trap comprising a hollow tubular member having an open end, a flap pivoted to said member and at least partially closing said open end in normal position but swingable inwardly of said member out of closing relation thereto, yieldable means tending to maintain said flap in normal position, and a flexible element passed freely through an apertured wall of said tubular member, and having a contractible noose-like portion within the member, the outer end of said element being anchorable externally of said member, said noose-like portion in contracting moving toward the free portion of the flap to engage the latter to move the flap toward its normal position.

15. In an animal trap, an abutment and a movable jaw spaced to receive the leg of an animal between them, said jaw being moved toward the abutment upon attempted withdrawal of the leg to wedgingly engage the latter, and means for anchoring the trap.

16. In an animal trap, an abutment and a movable jaw spaced to receive the leg of an animal between them, said jaw being moved toward the abutment upon attempted withdrawal of the leg to wedgingly engage the latter, and a noose-like element having an extension forming an anchoring member for the trap, said element being tightened upon displacement of the trap to engage the leg of the animal in cooperation with said jaw.

17. An animal trap, comprising a hollow tubular member having an open end, a pintle supported between adjacent wall portions of said member adjacent said open end, a flap mounted on said pintle and at least partially closing said open end in normal position but swingable inwardly of said member out of closing relation thereto, a coil spring mounted on said pintle with its ends engaging the member and flap to yieldingly maintain the latter in normal position, and means for anchoring the trap.

18. An animal trap comprising a hollow tubular member having an outwardly flared open end, a pintle supported between adjacent wall portions of said member adjacent said open end, a flap mounted on said pintle and at least partially closing said open end in normal position but swingable inwardly of said member out of closing relation thereto, a coil spring mounted on said pintle with its ends engaging the member and flap to yieldingly maintain the latter in normal position, and means for anchoring the trap.

In testimony whereof we have hereunto set our hands.

FRANK MAGEE.
GEORGE WASHINGTON HAVERBECK.